United States Patent
Ahlert et al.

(10) Patent No.: US 6,777,636 B2
(45) Date of Patent: Aug. 17, 2004

(54) LOW-VOLTAGE POWER SWITCH WITH A BEARING ARRANGEMENT FOR A SWITCH SHAFT

(75) Inventors: Torsten Ahlert, Fürstenwalde (DE); Ludvik Godesa, Berlin (DE); Marc Liebetruth, Glienicke (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/467,940

(22) PCT Filed: Feb. 13, 2002

(86) PCT No.: PCT/DE02/00562

§ 371 (c)(1),
(2), (4) Date: Aug. 14, 2003

(87) PCT Pub. No.: WO02/067280

PCT Pub. Date: Aug. 29, 2002

(65) Prior Publication Data

US 2004/0070473 A1 Apr. 15, 2004

(30) Foreign Application Priority Data

Feb. 16, 2001 (DE) .................. 201 03 230 U

(51) Int. Cl.⁷ ..................... H01H 9/00; F16C 35/02
(52) U.S. Cl. ............... 200/401; 200/244; 218/22; 384/296
(58) Field of Search ............... 200/303, 564, 200/337, 244, 400, 401, 500, 501, 334; 218/9, 152–155, 22; 335/6, 8–17, 21–27, 132, 189, 202; 384/276, 295, 296, 154, 416, 428, 430, 441, 435

(56) References Cited

U.S. PATENT DOCUMENTS

| | | | | |
|---|---|---|---|---|
| 5,735,611 A | * | 4/1998 | Godesa | 384/296 |
| 6,018,284 A | * | 1/2000 | Rival et al. | 335/16 |
| 6,380,830 B1 | * | 4/2002 | Dahl et al. | 335/68 |
| 6,492,888 B2 | * | 12/2002 | Dahl et al. | 335/202 |
| 6,657,524 B2 | * | 12/2003 | Bach et al. | 335/6 |
| 6,689,979 B1 | * | 2/2004 | Bach et al. | 218/40 |

FOREIGN PATENT DOCUMENTS

| | | |
|---|---|---|
| DE | 4416090 | 6/1995 |
| DE | 29617388 | 3/1998 |
| DE | 19739702 | 12/1998 |
| DE | 19948716 | 12/2000 |

* cited by examiner

Primary Examiner—Michael A. Friedhofer
(74) Attorney, Agent, or Firm—Harness, Dickey & Pierce, P.L.C.

(57) ABSTRACT

A low-voltage power switch, includes a drive device, fixed by way of a supporting framework and an associated switch shaft, fixed by way of two axially external bearing sub-assemblies, to the switch pole sub-assembly. In order to ensure that the fitting corresponds to a position based on separate examination of the drive device, the bearing arrangement has an additional, axially central bearing sub-assembly. The bearing sub-assembly includes two half-shells which are axially fixed by way of guide surfaces, whereby one is radially supported on the switch pole sub-assembly and the other is radially supported on the supporting framework of the drive device.

18 Claims, 3 Drawing Sheets

LOW-VOLTAGE POWER SWITCH WITH A BEARING ARRANGEMENT FOR A SWITCH SHAFT

Figure 1:
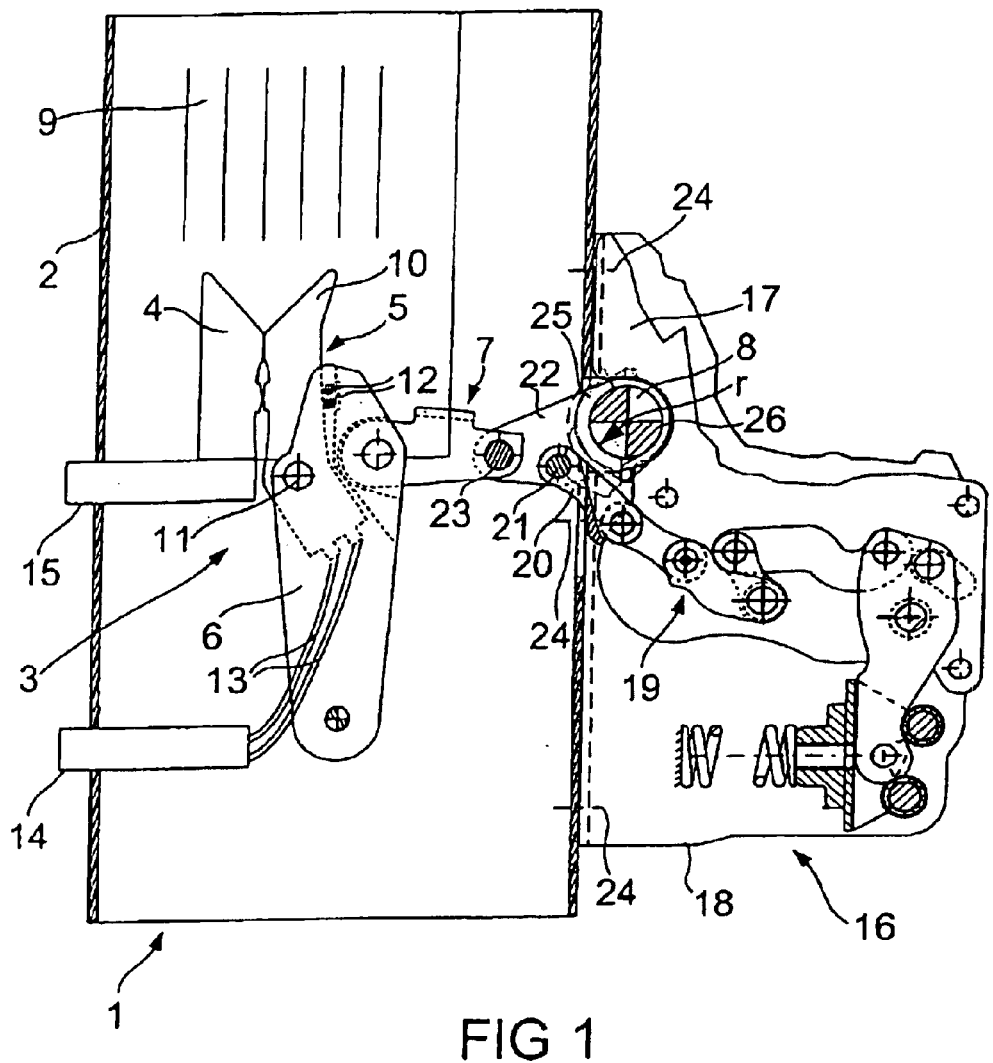

This application is the national phase under 35 U.S.C. § 371 of PCT International Application No. PCT/DE02/00562 which has an International filing date of Feb. 13, 2002, which designated the United States of America and which claims priority on German Patent Application number DE 201 03 230.9 filed Feb. 16, 2001, the entire contents of which are hereby incorporated herein by reference.

FIELD OF THE INVENTION

The invention generally relates to the field of the design configuration of a circuit breaker which is used in low-voltage power supply systems. Preferably, it relates to a circuit breaker which can be used for an embodiment of the bearing for the switching shaft in a switch.

BACKGROUND OF THE INVENTION

Low-voltage circuit breakers include two or more assemblies which are matched to the various task elements and are connected to one another during the production of the circuit breakers. The largest assembly is in this case the switching pole assembly, that is to say the switching poles which are arranged in a common housing or in individual housings which are connected to form a unit. The expression switching pole is intended to refer to all parts of a circuit breaker which are associated with the same pole of a circuit, in particular the contact system which includes stationary and moving contacts, with its supporting elements, its insulating elements and its coupling linkages for coupling the contact system of the switching pole to a switching shaft which is shared by all the switching poles. The movement sequences which are produced by a drive apparatus are transmitted to the switching shaft by way of a further coupling linkage which is associated with the drive.

Until now, the switching shaft has been physically associated either with the drive apparatus or with the switching pole assembly. In one known circuit breaker, in which the switching shaft is physically associated with the drive apparatus, the switching shaft is arranged in its central region—in which the drive force is introduced into the switching shaft—in parallel walls, which are connected to one another and which form the supporting mechanism for the drive apparatus. The two ends of the switching shaft are mounted in further walls, which are connected to the walls which support the drive apparatus (DE 44 16 090 C1). A functional test of the switching pole assembly—in particular a test to determine whether the movement which is provided by the drive apparatus will achieve correct closure of the contact arrangements of the switching poles with the required contact force—cannot be carried out until the switch has been assembled completely.

In another known switch, in which the switching shaft is physically associated with the switching assembly, the switching shaft is formed in two parts and is held in its central region by a main bearing body. In this case, the main bearing body is in each case fitted with one end of the two switching shaft parts, and is at the same time used to fix these two switching shaft parts axially at one end. The other axially outer end of the two switching shaft parts is in each case held in each case one auxiliary bearing body, which is likewise connected to the switching pole assembly. The switching shaft is thus positioned geometrically on the switching pole assembly such that the switching pole assembly can be tested autonomously by a test apparatus which simulates the drive movement of the drive. On the other hand, this arrangement makes it possible to test the drive apparatus autonomously, as well, in order to determine whether it produces the necessary rotary movement of the switching shaft (DE 197 39 702 C1).

Against the background of this arrangement, in another known switch, the switching shaft is likewise physically associated with the switching pole assembly. However, the switching shaft is integral in this switch. In order to mount this integral switching shaft such that it is not sensitive to tolerances and is simple to install at the point at which the switching forces act, the two ends of the switching shaft have associated bearing bodies which—surrounding the switching shaft in the form of half shells—are mounted on the switching pole assembly (DE 199 48 716 C1). The bearing for the switching shaft is determined statically by way of a configuration such as this of the two axially outer bearing bodies. Depending on the length of the switching shaft, auxiliary bearing bodies to provide additional bearing for the switching shaft can be arranged in a known manner in this arrangement.—In this switch as well, both the switching pole assembly and the drive apparatus can be tested autonomously before being assembled.

However, the process of assembling these two assemblies can lead to the switching shaft no longer being rotated in the desired manner by the drive apparatus, owing to component tolerances, installation tolerances and switching shaft deformation in the central region of the switching shaft (in particular bending and torsion of the switching shaft in this region). For example, the rotation angle of the switching shaft may change, which leads to a change in the contact force between the stationary and the moving contacts. If the contact force is too great, the drive apparatus must be designed to be stronger, which necessarily results in more complex measures for shock damping. An excessively low contact force on the other hand leads to heating and to faster contact wear.

SUMMARY OF THE INVENTION

An embodiment of the invention is based on an object of refining the bearing assembly such that the installation position of the switching shaft after assembly of the drive apparatus and of the switching pole assembly corresponds to that position of the switching shaft on which the separate test of the drive apparatus was based.

According to an embedment of the invention, an object may be achieved in that, if the supporting mechanism of the drive apparatus is mounted on the switching pole assembly, the axially central bearing assembly has two bearing half shells, one of which is supported radially on the switching pole assembly and the other of which is supported radially on the supporting mechanism, and is fixed axially via guide surfaces.

With a refinement such as this, in which the bearing for the switching shaft is still determined statically, there is a precise geometric association between the drive apparatus and the switching pole assembly in the region where the drive forces are introduced. In this case, the bearing half shell which is associated with the switching pole assembly can advantageously be held in a captive manner between the switching pole assembly and the switching shaft.

The drive apparatus is normally coupled to the switching shaft by way of a bolt, which on the one hand passes through a first lever, which forms the end of a coupling linkage of the drive apparatus, and on the other hand passes through a second lever which projects radially from the switching shaft. If this bolt is provided with a bolt head and if the bearing assembly is arranged at a distance alongside one of the two levers, and one of the two bearing half shells is provided with a lug-like flange on the side associated with this lever, then the bolt can be fixed axially in a simple and reliable manner, by the lever and the lug-like flange forming side guide surfaces for the bolt head. In this case, the fitting of the bolt can be simplified in that the bearing half shell which is provided with the lug-like flange can be moved in the circumferential direction of the switching shaft in order to expose the bolt head when the supporting mechanism has been released from the switching pole assembly, and can be forced to move back to its mounting position by the other bearing half shell, which is fixed in the circumferential direction of the switching shaft, by placing the supporting mechanism on the switching pole assembly.

BRIEF DESRIPTION OF THE DRAWINGS

Figure 2:
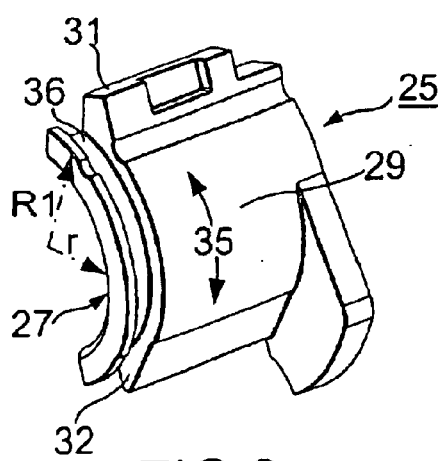
Figure 3:
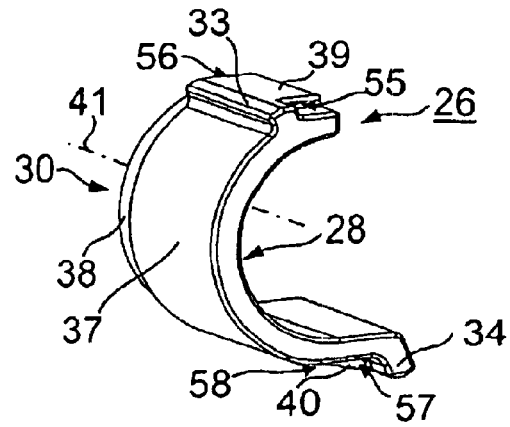
Figure 4:
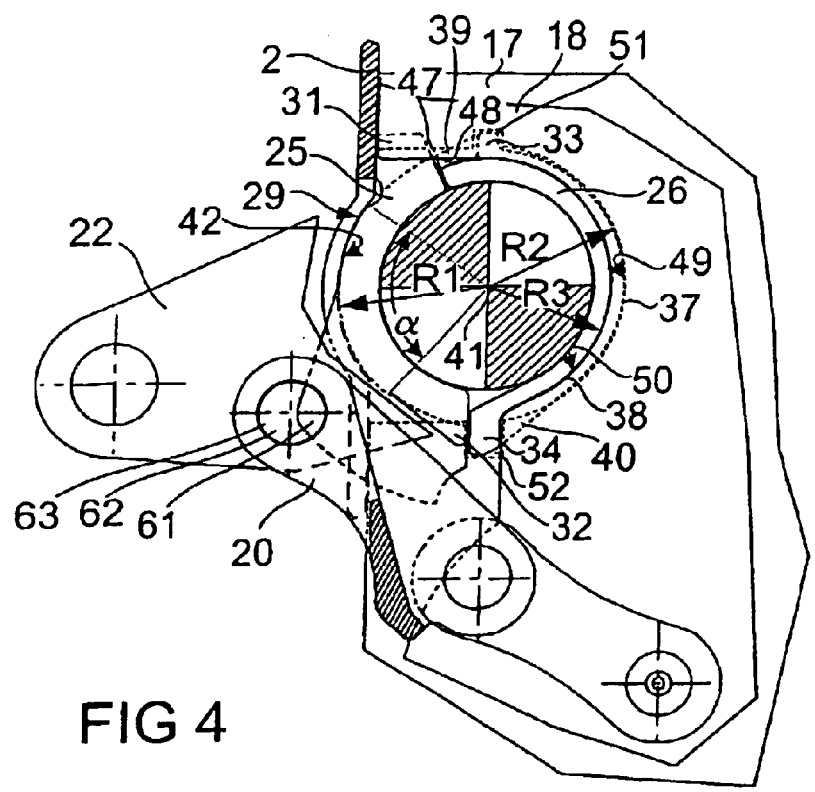
Figure 5:
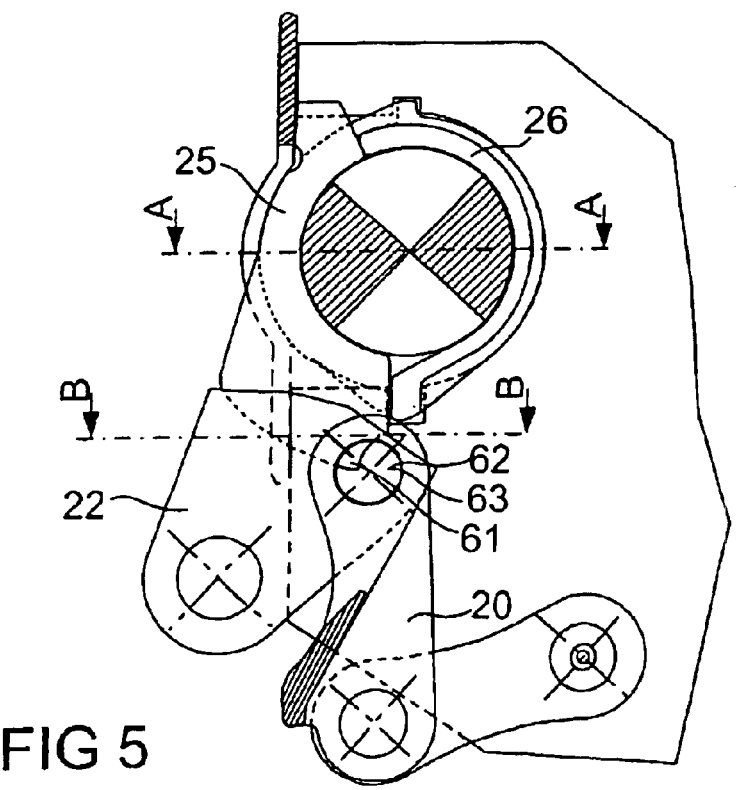
Figure 6:
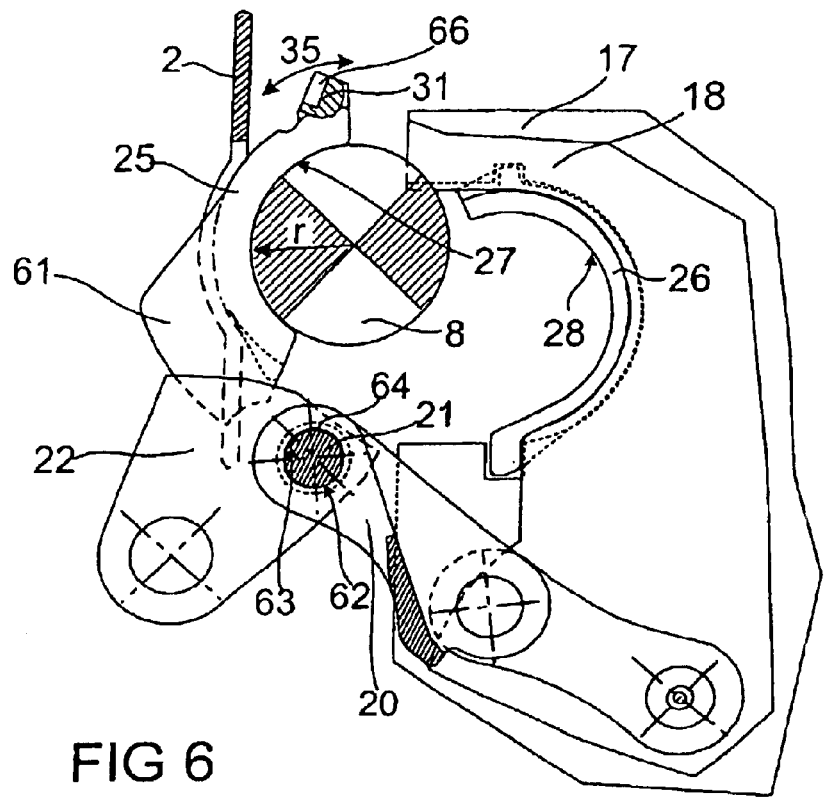
Figure 7:
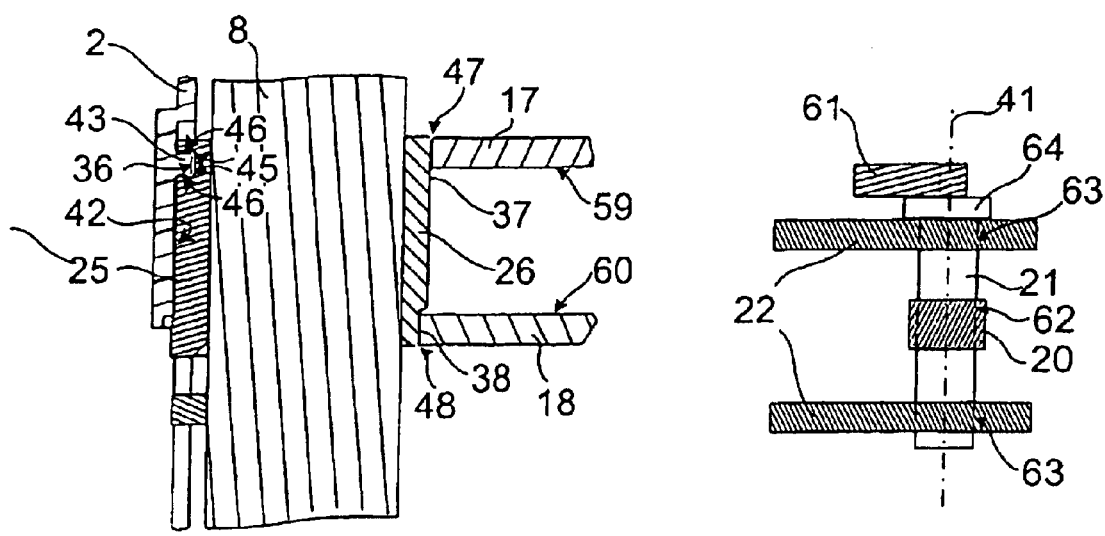
Figure 8:
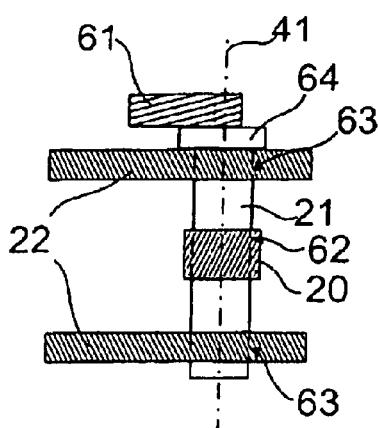

A low-voltage circuit breaker designed according to an embodiment of the invention is illustrated in FIGS. 1 to 8, in which:

FIG. 1 shows a schematically illustrated low-voltage circuit breaker with a supporting mechanism, which is mounted on a switching pole assembly, of a drive apparatus and with a switching shaft whose axially central region has an associated bearing assembly with two bearing half shells, FIG. 2 shows a perspective view of one of the two bearing half shells which, as shown in FIG. 1, is supported on the switching pole assembly, FIG. 3 shows a perspective view of the other bearing half shell which, as shown in FIG. 1, is supported on the supporting mechanism of the drive apparatus, FIGS. 4 to 6 show a detail of the low-voltage circuit breaker as illustrated in FIG. 1, in various phases of the movement and fitting sequence, and FIGS. 7 and 8 show the detail of the low-voltage circuit breaker as shown in FIG. 5, illustrated sectioned along the lines A–A and B–B.

DETAILED DESCRIPTION OF TH PREFERRED EMBODIMENTS

The low-voltage circuit breaker as shown in FIG. 1 has a switching pole assembly 1 in which a contact system 3 is arranged in a housing 2. The contact system 3 is part of a switching pole of this switch, and has a stationary contact 4 and a moving contact 5. A contact mount 6 which can pivot and to which the moving contact 5 is fitted, and a coupling linkage 7 for coupling the contact mount 6 to a switching shaft 8, are also arranged in the housing 2. In this case, an arcing chamber 9 can be inserted into the housing 2 in a known manner. The moving contact 5 comprises two or more contact levers 10 which are arranged parallel to one another, are held in the contact mount by way of a hinge bolt 11 such that they can pivot, and are prestressed by in each case two contact force springs 12. Flexible conductors 13 are used for connecting the contact levers 10 to a lower connecting rail 14. The stationary contact 4 which is associated with the moving contact is connected to an upper connecting rail 15.

The switching shaft 8 is geometrically associated with the switching pole assembly in the manner which is known from DE 199 48 716 C1. In this case, two axially outer bearing assemblies, which are not illustrated here but which surround the two ends of the switching shaft in the form of half shells, are mounted on the housing of the switching pole assembly. The drive force from a drive apparatus 16 which is held in a supporting mechanism that is formed from parallel walls 17 and 18 is introduced in the axially central region of the switching shaft 8. For this purpose, a lever 20 which forms the end of a coupling linkage 19 of the drive apparatus 16 is coupled by way of a bolt 21 (see also FIG. 8) to a lever 22 which is arranged fixed on the switching shaft 8, projects radially from the switching shaft, and is formed in two parts. The coupling linkage 7 which is associated with the contact mount 6 is also coupled to the lever 22 by way of a further bolt 23. The supporting mechanism 17, 18 of the drive apparatus 16 is mounted on the housing 2 of the switching pole assembly 1 by way of screw connections, which are not shown in any more detail in FIG. 1, when the switch is assembled. The position of these screw connections is shown by the axes 24 in FIG. 1.

The axially central region of the switching shaft, which is used for coupling of the drive apparatus, has an associated further bearing assembly which is formed from two bearing half shells 25 and 26. In this case, one of the two bearing half shells 25 is geometrically associated with the switching pole assembly 1, and the other bearing half shell 26 is geometrically associated with the drive apparatus 16.

As is shown in FIGS. 2 and 3, each of the two bearing half shells 25 and 26 has a respective inner surface section 27 and 28, which is matched precisely to the external diameter r on the switching shaft 8, a respective outer surface section 29 and 30 which is curved in a circular shape and is used for radial support, as well as respective edges 31 and 32 as well as 33 and 34, which are bent like webs. A groove 36 which runs in the circumferential direction 35 of the switching shaft is formed, for axial fixing, on the first bearing half shell 25 (FIG. 2) in the region of the outer surface section 29, whose radius is R1 (see also FIG. 7); the outer surface section 30 on the second bearing half shell 26 (FIG. 3) is formed by two radially adjacent subsections 37 and 38, with ribs 39 and 40 which run transversely with respect to the switching shaft axis 41 being formed in the region of the subsection 37.

As is shown in FIG. 4, the first bearing half shell 25 is supported by its outer surface section 29 on an opposing surface 42, which is likewise curved in a circular shape with the radius R1, of the housing 2 of the switching pole assembly. The circular arc angle a of the outer surface section 29 in this case governs the angular range within which the first bearing half shell can move in the circumferential direction of the switching shaft when the switching shaft is installed. Further movement of the first bearing half shell 25 beyond this limited angular range is prevented by edges 31 and 32 of the bearing half shell 25, which are adjacent to the outer surface section, are bent like webs and strike the housing 2 in the event of further rotation.

As shown in FIG. 7, the housing 2 has an internal collar 43 in the region of the opposing surface 42, which internal collar 43 is in the form of a half shell and projects into the groove 36 when the first bearing half shell 25 is held between the housing 2 and the switching shaft 8. The side surfaces 45 of the groove 36 and the side surfaces 46 of the internal collar 43 thus form guide surfaces which are associated with one another, via which the first bearing half shell is fixed axially. The second bearing half shell 26 is supported by its first subsection 37 in an opening 47 at the edge of the wall 17 and of the supporting mechanism of the drive apparatus, and is supported by its second subsection 38 in an opening 48 at the edge of the wall 18.

In this case, the first subsection 37 and a first edge section 49 of the opening 47 at the edge have the radius R2, and the second subsection 38 and a first edge section 50 of the opening 48 at the edge have the radius R3, where R3<R2. Each of the two edges 33 and 34 (which are bent like webs) of the second bearing half shell 26 engages in a respective groove 51 and 52. The grooves 51 and 52 are formed in further edge sections of the opening 47 at the edge. At the same time, one of the two edges 34 which is bent like a web rests on the wall 18. Each of the ribs 39 and 40, which run transversely with respect to the switching shaft axis 41, of the second bearing half shell 26 lies with its side surfaces 55 and 56 as well 57 and 58 (see FIG. 3) on the mutually facing sides 59 and 60 (see FIG. 7) of the walls 17 and 18. These side surfaces and the walls thus form mutually associated guide surfaces, via which the second bearing half shell is fixed axially.

The axially central bearing assembly 25, 26 is arranged alongside one part of the lever 22 of the switching shaft. The lever 22 and the lever 20, which is coupled to it, of the drive apparatus can move in the region between a connected position as shown in FIG. 4 (in which the contacts are closed) and a disconnected position as shown in FIG. 5 (in which the contacts are open). A lug-like flange 61 is formed on the first bearing half shell 25 such that it extends parallel to the movement path of the through-holes 62 and 63, which are associated with the bolt 21, in the levers 20 and 22.

The bolt 21, which, as shown in FIG. 8, is inserted into the through-openings 62 and 63 and is provided with a bolt head 64, is thus fixed axially in all phases of the movement sequence of the levers 20 and 22, such that one part of the lever 22 and the lug-like flange 61 form side guide surfaces for the bolt head 64. In a refinement such as this, there is no need for the bolt to be secured in a manner which is not convenient for assembly and is risky via, for example, of a locking ring.

As shown in FIG. 6, the first bearing half shell 25, which is provided with the lug-like flange 61, can move in the circumferential direction 35 of the switching shaft when the supporting mechanism 17, 18 has been released from the housing 2 of the switching pole assembly. In order to allow the first bearing half shell 25 to move easily, it has a recess 66, in which a tool—for example a screwdriver—can be supported, in the region of one of the edges 31 which run parallel to the switching shaft axis and are bent like webs. If the bearing half shell is moved in the clockwise sense in the circumferential direction of the switching shaft, the lug-like flange 61 now no longer covers the through-holes 62 and 63 in the levers 20 and 22, so that the bolt 21 can be inserted into the through-holes until its bolt head 64 rests on one part of the lever 22. When the supporting mechanism 17, 18 (which supports and axially fixes the second bearing half shell 26) of the drive apparatus is fitted, the first bearing half shell 25 is forced by the second bearing half shell 26 to move back until the edge 31 which is bent like a web rests on the housing 2.

The inner surface section 27 of the first bearing half shell and the inner surface section 28 of the second bearing half shell are precisely matched to the switching shaft diameter r, so that this results in a precise geometric association between the drive apparatus and the switching pole assembly in the axially central region of the switching shaft, via the switching shaft 8, which is enclosed by the two bearing half shells 25 and 26. On the basis of an association such as this, the supporting mechanism can be mounted on the housing of the switching pole assembly via the screw connections—which are designed in a correspondingly manner with a tolerance—such that this precise association is maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low-voltage circuit breaker, comprising:

a switching pole assembly, adapted to hold at least one contact arrangement;

a supporting mechanism, adapted to hold a drive apparatus, a switching shaft, adapted to transmit a drive force from the drive apparatus to the contact arrangements, and a bearing arrangement for the switching shaft, including at least two axially outer bearing assemblies and one axially central bearing assembly, wherein the switching shaft is mounted on the switching pole assembly by the two axially outer bearing assemblies, and wherein upon the supporting mechanism being mounted on the switching pole assembly, the axially central bearing assembly includes two bearing half shells, one supported radially on the switching pole assembly and the other supported radially on the supporting mechanism, and is fixed axially via guide surfaces.

2. The low-voltage circuit breaker as claimed in claim 1, wherein the bearing half shell, associated with the switching pole assembly upon the switching shaft being mounted on the switching pole assembly, is held in a captive manner between the switching pole assembly and the switching shaft.

3. The low-voltage circuit breaker as claimed in claim 2, wherein, upon the drive apparatus being coupled into the switching shaft by a bolt passing through a first lever, which forms an end of a coupling linkage of the drive apparatus, and a further lever projecting radially from the switching shaft, the central bearing assembly is arranged at a distance alongside one of the two levers, one of the two bearing half shells is provided with a lug-like flange on a side associated with the one of the two levers, and the bolt includes a bolt head, wherein the lever and the lug-like flange form side guide surfaces for the bolt head, in order to fix the bolt axially.

4. The low-voltage circuit breaker as claimed in claim 1, wherein upon the drive apparatus being coupled into the switching shaft by a bolt passing through a first lever, which forms an end of a coupling linkage of the drive apparatus, and a further lever projecting radially from the switching shaft, the central bearing assembly is arranged at a distance alongside one of the two levers, one of the two bearing half shells is provided with a lug-like flange on a side associated with the one of the two levers and the bolt includes a bolt head, wherein the one lever and the lug-like flange form side guide surfaces for the bolt heady, in order to fix the bolt axially.

5. The low-voltage circuit breaker as claimed in claim 4, wherein the bearing half shell, provided with the lug-like flange, is adapted to be moved in a circumferential direction of the switching shaft in order to expose the bolt head when the supporting mechanism has been released from the switching pole assembly, and is adapted to be forced to move back to a mounting position by the other bearing half shell, which is fixed in the circumferential direction of the switching shaft; by placing the supporting mechanism on the switching pole assembly.

6. The low-voltage circuit breaker as claimed in claim 4, wherein the bearing half shell, provided with the lug-like flange, is adapted to be moved in a circumferential direction of the switching shaft in order to expose the bolt head when the supporting mechanism has been released from the switching pole assembly, and is adapted to be forced to move back to a mounting position by the other bearing half shell, which is fixed in the circumferential direction of the switching shaft, by placing the supporting mechanism on the switching pole assembly.

7. A low-voltage circuit breaker, comprising:
   a first assembly, adapted to hold at least one contact arrangement;
   a mechanism, adapted to hold a drive apparatus,
   a shaft, adapted to transmit a drive force from the drive apparatus to the contact arrangement; and
   a bearing arrangement, including at least two axially outer bearing assemblies and one axially central bearing assembly, wherein the shaft is mounted on the first assembly by the two axially outer bearing assemblies, and wherein, upon the mechanism being mounted on the first assembly, the axially central bearing assembly includes two bearing half shells, one supported radially on the first assembly and the other supported radially on the mechanism.

8. The low-voltage circuit breaker as claimed in claim 7, wherein the two bearing half shells are fixed axially via guide surfaces.

9. The low-voltage circuit breaker as claimed in claim 8, wherein the bearing half shell, associated with the first assembly upon the shaft being mounted on the first assembly, is held in a captive manner between the first assembly and the shaft.

10. The low-voltage circuit breaker as claimed in claim 8, wherein the drive apparatus is coupled into the shaft by a bolt passing through a first lever, which forms the end of a coupling linkage of the drive apparatus, and including a further lever projecting radially from the shaft.

11. The low-voltage circuit breaker as claimed in claim 10, wherein the central bearing assembly is arranged at a distance alongside one of the two levers, one of the two bearing half shells is provided with a lug-like flange on a side associated with the one of the two levers and the bolt includes a bolt head, wherein the lever and the lug-like flange form side guide surfaces for the bolt head, in order to fix the bolt axially.

12. The low-voltage circuit breaker as claimed in claim 11, wherein the bearing half shell, provided with the lug-like flange, is adapted to be moved in a circumferential direction of the shaft in order to expose the bolt head when the mechanism has been released from the first assembly, and is adapted to be forced to move back to a mounting position by the other bearing half shell, which is fixed in the circumferential direction of the shaft, by placing the mechanism on the first assembly.

13. A low-voltage circuit breaker, comprising:
   first means for holding at least one contact arrangement;
   second means for holding a drive apparatus,
   means for transmitting a drive force from the drive apparatus to the contact arrangement; and
   a bearing arrangement, including at least two axially outer bearing assemblies and one axially central bearing assembly, wherein the transmitting means is mounted on the first means by the two axially outer bearing assemblies, and wherein, upon the second means being mounted on the first means, the axially central bearing assembly includes two bearing half shells, one supported radially on the first means and the other supported radially on the second means.

14. The low-voltage circuit breaker as claimed in claim 13, wherein the two bearing half shells are fixed axially via guide surfaces.

15. The low-voltage circuit breaker as claimed in claim 13, wherein the bearing half shell, associated with the first means upon the transmitting means being mounted on the first means, is held in a captive manner between the first means and the transmitting means.

16. The low-voltage circuit breaker as claimed in claim 13, wherein the drive apparatus is coupled into the transmitting means by a bolt passing through a first lever, which forms an end of a coupling linkage of the drive apparatus, and including a further lever projecting radially from the transmitting means.

17. The low-voltage circuit breaker as claimed in claim 16, wherein the central bearing assembly is arranged at a distance alongside one of the two levers, one of the two bearing half shells is provided with a lug-like flange on a side associated with the one of the two levers and the bolt includes a bolt head, wherein the lever and the lug-like flange form side guide surfaces for the bolt head, in order to fix the bolt axially.

18. The low-voltage circuit breaker as claimed in claim 17, wherein the bearing half shell, provided with the lug-like flange, is adapted to be moved in a circumferential direction of the shaft in order to expose the bolt head when the second means has been released from the first assembly, and is adapted to be forced to move back to a mounting position by the other bearing half shell, which is fixed in the circumferential direction of the shaft, by placing the second means on the first means.

* * * * *